US007218684B2

(12) United States Patent
Bolourchi et al.

(10) Patent No.: US 7,218,684 B2
(45) Date of Patent: May 15, 2007

(54) METHOD AND SYSTEM FOR CODE REUSE AND CAPACITY ENHANCEMENT USING NULL STEERING

(75) Inventors: Nader Bolourchi, Larchmont, NY (US); Leonid Kazakevich, Plainview, NY (US); Rui Yang, Greenlawn, NY (US)

(73) Assignee: Interdigital Technology Corporation, Wilmington, DE (US)

( * ) Notice: Subject to any disclaimer, the term of this patent is extended or adjusted under 35 U.S.C. 154(b) by 977 days.

(21) Appl. No.: 10/284,741

(22) Filed: Oct. 31, 2002

(65) Prior Publication Data
US 2003/0108084 A1 Jun. 12, 2003

Related U.S. Application Data

(60) Provisional application No. 60/335,616, filed on Nov. 2, 2001.

(51) Int. Cl.
H04L 27/12 (2006.01)
H04L 7/02 (2006.01)
G01S 13/00 (2006.01)

(52) U.S. Cl. .................. 375/304; 375/267; 342/153
(58) Field of Classification Search ............... 375/304, 375/267, 295, 347; 342/153, 367, 347, 368; 455/562, 456
See application file for complete search history.

(56) References Cited

U.S. PATENT DOCUMENTS 6,115,406 A 9/2000 Mesecher 6,748,024 B2* 6/2004 Kuchi et al. ............... 375/299
2002/0044591 A1* 4/2002 Lee et al. ................... 375/130
2002/0155818 A1 10/2002 Boros et al.

FOREIGN PATENT DOCUMENTS

| EP | 1191706 | 3/2002 |
|---|---|---|
| JP | 2001-127699 | 5/2001 |
| JP | 2001-169344 | 6/2001 |
| WO | 01/71928 | 9/2001 |
| WO | 01/76110 | 10/2001 |

OTHER PUBLICATIONS

Kishiyama et al. "Weight Estimation For Downlink Null Steering In A TDD/SDMA System" 2000 IEEE.
Jotten et al. "Comparison of Transmit Array Algorithms for Code Division Multiple Access downlinks Operating in the Frequency Division Duplexing Mode" Research Group for RF Communications, University of Kaiserslautern, 2001 IEEE, pp. E-16-E-21.

(Continued)

Primary Examiner—Khai Tran
(74) Attorney, Agent, or Firm—Volpe and Koenig, P.C.

(57) ABSTRACT

The number of users and data capacity of wireless systems are increased by employing apparatus and method for increasing the number of spreading codes available in the system by providing a mechanism to reuse the already allocated spreading code or use the codes that may correlate to those already being used within the same sector/cell. This, in return, provides capacity improvement proportional to the number of added base station (BS) antennas for each cell. An antenna null steering technique for code allocation maintains the cross correlation properties of the codes only for the desired user and to obtain a gain in capacity improvement.

15 Claims, 2 Drawing Sheets

OTHER PUBLICATIONS

Nishimura et al. "Downlink Beamforming Performance for an SDMA Terminal Joint with Joint Detection," IEEE VTC, Oct. 11, 2001, vol. 3, pp. 1538-1542.

Nishimura et al. "SDMA Downlink Beamforming for a MIMO Channel," The Institute of Electronics, Information and Communication Engineers, Oct. 2001. (English Abstract Only).

* cited by examiner

METHOD AND SYSTEM FOR CODE REUSE AND CAPACITY ENHANCEMENT USING NULL STEERING

CROSS REFERENCE TO RELATED APPLICATION

This application claims priority from U.S. provisional application No. 60/335,616, filed Nov. 2, 2001, which is incorporated by reference as if fully set forth.

FIELD OF THE INVENTION

The present invention relates to the field of wireless communication. More specifically, the present invention relates to increasing the number of users and data capacity and data rate of wireless systems. More specifically, in order to increase the capacity, the present invention employs a system which allows the same or correlated signatures to be used for different users simultaneously during the operation of the system.

BACKGROUND OF THE INVENTION

Traditionally, the capacity of Code Division Multiple Access (CDMA) systems, the number of users simultaneously supported in a cell and the data rate allocated to the users, are dependent on availability of the spreading codes functioning as user's signatures, and their cross-correlation properties. If one code is assigned to a user, it cannot be used for the other uses at the same time. This rule is adopted even for the systems with multiple transmission antennas which generates beam steering (beam forming) as a means of interference reduction. Although the current beam steering technology can achieve certain capacity enhancement, the result (of capacity enhancement) is quite limited since the interference cannot be completely removed to a specific location in the field. In addition, from an implementation point of view, such a multiple antenna system is quite complex.

SUMMARY OF THE INVENTION

This invention provides a mechanism to allow reusing the already allocated spreading code or using the codes that may correlate to those already being used within the same sector and/or cell. This in return provides capacity improvement proportional to the number of added Base Station antennas for each cell. The present invention employs an antenna null steering technique for code allocation to maintain the cross correlation properties of the codes only for the desired user and to gain capacity improvement.

BRIEF DESCRIPTION OF THE INVENTION

The present invention will be understood when reading the accompanying description and drawings, wherein like elements are designated by like numerals, and wherein.

DETAILED DESCRIPTION OF THE INVENTION AND THE PREFERRED EMBODIMENTS THEREOF

The present invention uses a simple antenna null steering technique for suppressing the power of the undesired interference signals, which may use the same or correlated spreading codes, at a desired receiver. Since the spreading codes can be reused simultaneously, the capacity of the whole system can be increased. The simplicity and ease of implementation is one advantage of the null steering method. However, due to the ease of implementation, the null steering technique can be used as a complementary method along with beam steering to provide further improvement of system capacity.

The concept may use different spreading codes, users and antennas. However, the present invention is described using the same or correlated spreading code for N users simultaneously, utilizing N+1 antennas. Channel information such as the spatial information is used by N+1 antennas of a Base Station BS to create a null at all user locations with the identical or correlated spreading code but the desired one. The concept is illustrated below for the case where N=2, where N=the number of users.

Figure 1:
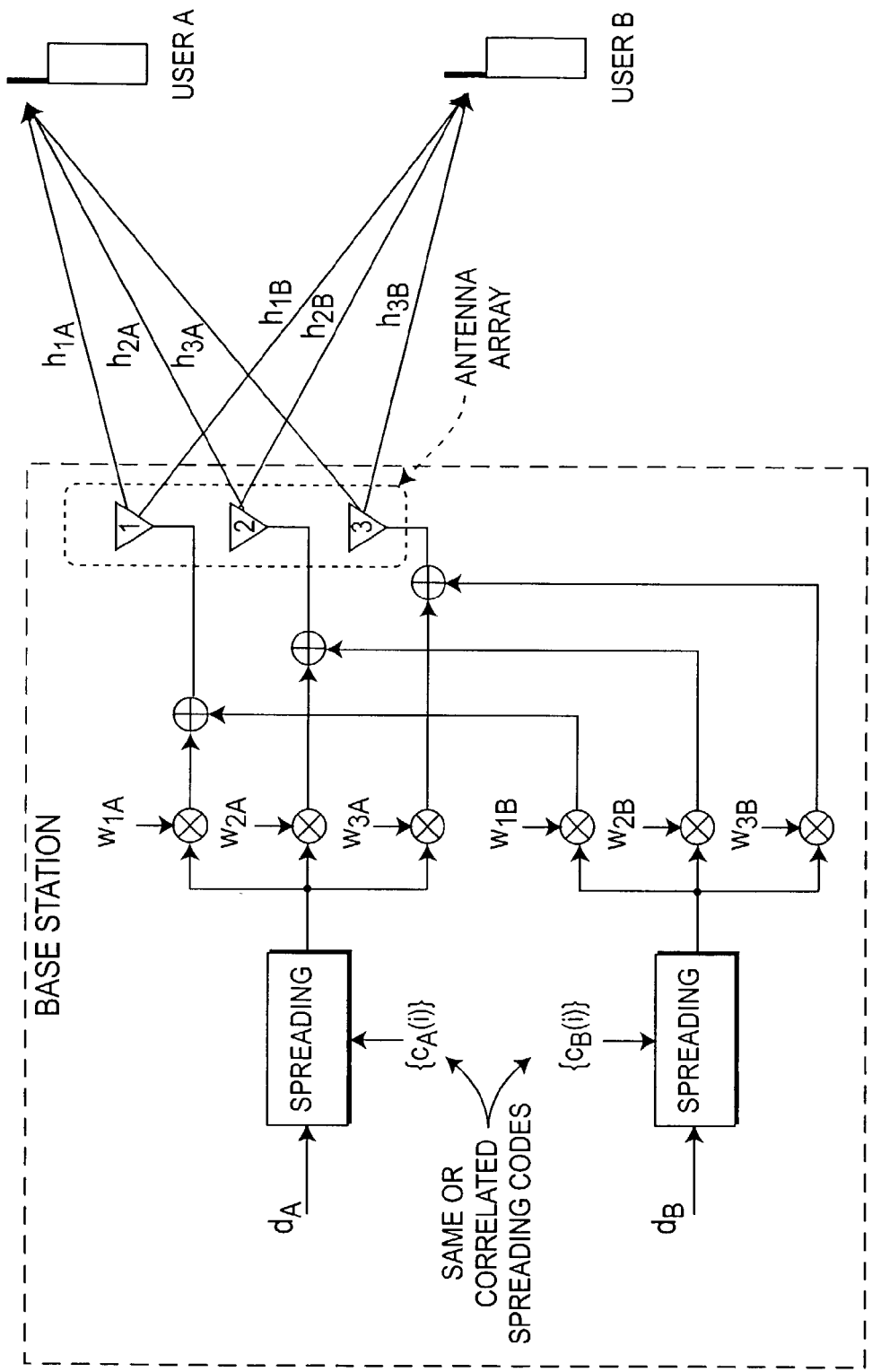
FIG. 1 is a schematic diagram of a processing unit embodying the principles of the present invention.

Considering a two-user case. The system is depicted in FIG. 1, where, for i=1, 2, 3, $h_{iA}$ and $h_{iB}$ represent the channel impulse responses from antenna i to user A and user B, respectively. $d_A$ and $d_B$ indicate the data transmitted to the user A and B, respectively. Note that data $d_A$ and $d_B$ are spread by the same or correlated codes $\{c_A(k), k=1, 2, \ldots\}$ and $\{c_B(k), k=1, 2, \ldots\}$ before data transmission at the base station. Our objective is to transmit information for user A without creating any interference to user B and, at the same time, transmit information for user B without creating any interference to user A. This objective is achieved by creating a null at the location of user B by altering the composite channel impulse response from BS to user A and creating a null at the location of user A by altering the composite channel impulse response from BS to user B. Here the composite channel impulse response is defined as a transfer function from spreader output at the BS to the antenna user's receiver unit.

To create a null at user B, we will select the complex weights, $W_{1A}$, $W_{2A}$ and $W_{3A}$ so that the gain of the composite channel from the base station to user A is maximized and the composite channel gain from the base station to user B is 0. Mathematically, it is a constraint optimization problem, which can be expressed as follows:

$$\max_{w_{1A}, w_{2A}, w_{3A}} \left( \sum_{i=1}^{3} w_{iA} h_{iA} \right)^* \left( \sum_{i=1}^{3} w_{iA} h_{iA} \right) \qquad \text{Equation 1}$$

$$\text{subject to } \sum_{i=1}^{3} w_{iA} h_{iB} = 0$$

Similarly, to create a null at user A, we will select the complex weights, $w_{1B}$, $w_{2b}$ and $w_{3b}$ so that the gain of the composite channel from the base station to user B is maximized and the composite channel gain from the base station to user A is 0. Mathematically, it is likewise a constraint optimization problem, which can be expressed as follows:

$$\max_{w_{1B},w_{2B},w_{3B}} \left(\sum_{i=1}^{3} w_{iB}h_{iB}\right)^* \left(\sum_{i=1}^{3} w_{iB}h_{iB}\right) \quad \text{Equation 2}$$

$$\text{subject to } \sum_{i=1}^{3} w_{iB}h_{iA} = 0$$

The optimization problem described above can be easily solved. Next, as an example, we show how to determine $w_{1A}$, $w_{2A}$ and $w_{3A}$ from Equation 1. First from the constraint in Equation 1, we choose $w_{3A}$ as follows:

$$w_{3A} = -\frac{w_{1A}h_{1B} + w_{2A}h_{2B}}{h_{3B}} \quad \text{Equation 3}$$

Applying $w_{3A}$, the composite channel impulse response at user A becomes:

$$w_{1A}g_1 + w_{2A}g_2; \quad \text{Equation 4}$$

where, $$g_i = h_{iA} - \frac{h_{3A}}{h_{3B}}h_{iB} \text{ for } i = 1, 2 \quad \text{Equation 5}$$

In general, $g_i$ is a complex number. Define $g_i = \alpha_i e^{j\Phi_i}$ for $i=1, 2$; where $\alpha_i > 0$ for $i=1, 2$. Also, define $$w_{iA} = e^{j\theta_i} \text{ for } i = 1, 2.$$

It can be shown that the channel gain of the composite channel impulse response from the base station to user A is $$\left(\sum_{i=1}^{3} w_{iA}h_{iA}\right)^* \left(\sum_{i=1}^{3} w_{iA}h_{iA}\right) = \quad \text{Equation 6}$$

$$a_1^2 + a_2^2 + 2a_1a_2\cos(\theta_2 - \theta_1 + \phi_2 - \phi_1)$$

It is clear that, to reach the maximum possible gain, we should have:

$$\theta_2 - \theta_1 + \phi_2 - \phi_1 = 0 \quad \text{Equation 7}$$

One approach to satisfy the above equation is to choose:

$$w_{iA} = \frac{1}{a_i}g_i^* \text{ for } i = 1, 2 \quad \text{Equation 8}$$

Figure 2:
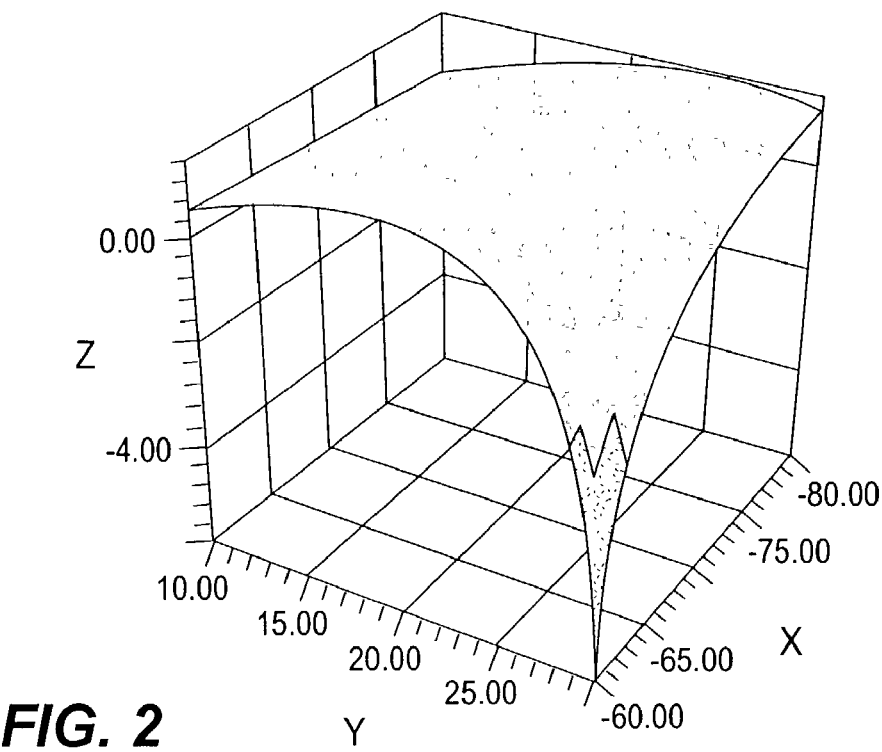
FIG. 2 is a three-dimensional diagram of the combined channel power profiles as calculated in accordance with a mathematical example of the present invention.
Figure 3:
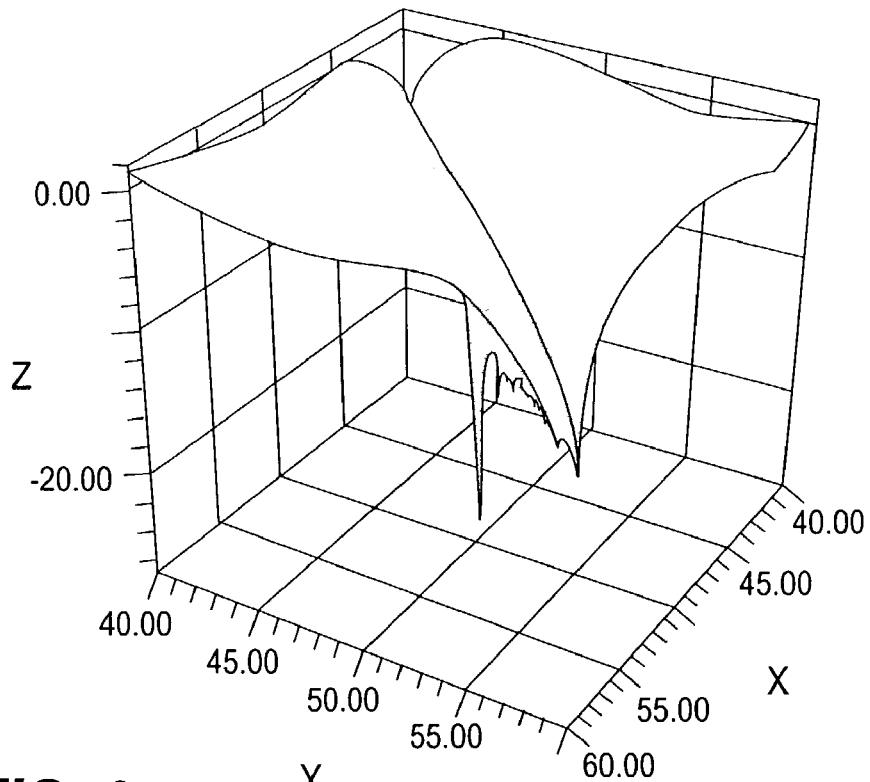
FIG. 3 is a three-dimensional diagram of the combined channel power profiles as calculated in accordance with a mathematical example of the present invention.

For example, define a simplified channel model as $$h_{ip} = \exp\left(j2\pi\frac{D_{ip}}{\lambda}\right); \quad \text{Equation 9}$$

for $i=1, 2, 3$, and $p=A, B$, where $D_{ip}$ is the distance from user p to antenna i, and $\lambda$ is the wavelength, which is 0.15 m in this example. In addition, we assume that the three (3) antennas are distributed along the X axis in a OXY plane with space between two adjacent antennas being 0.75 m and antenna 2 being placed at the origin (O) of the OXY plane. We choose the location for user A being $(xA, y_A) = (-70, 20)$ and user B being $(xB, y_B) = (50, 50)$. The composite channel power profiles (in dB) near these two points are shown in FIG. 2 and FIG. 3, respectively. Thus, by generating the complex values $w_{1A}$, $w_{2A}$ and $w_{3A}$, the desired user A, in the example of FIG. 1, will receive the communication with maximum power (FIG. 2) whereas the power at the other user will be nulled (FIG. 3).

What is claimed is:

1. A null beam technique wherein only one of at least two remote users, all of whom employ a same or a correlated spreading code within a given cell or sector, is enabled to receive a communication from a base station transmitting to the at least two remote users, said base station transmitting to said remote users over an antenna array having a plurality of antennas, comprising:

a) said base station modulating data $d_i$, for $i=1, \ldots, N$, intended for one of N (N>1) remote users with N+1 complex weights $w_i$ (for $i=1, \ldots, N$, each is a N+1 complex vector), each modulated signal being directed to one of said N+1 antennas;

wherein each element of the vectors $w_1$ and $w_2$ is a function of the channel impulse responses from the antenna array to locations of the remote users;

b) summing the modulated data signals $d_1, d_2, \ldots d_N$ and c) transmitting the summed signals.

2. The method of claim 1 wherein the complex weights $w_i$ are made a function of the number of antennas in the array.

3. The method of claim 1 wherein step (c) comprises transmitting over an array of at least two (2) antennas.

4. The method of claim 1 wherein step (a) includes selecting the complex weights so that a power of a communication received by a first one of the remote users from the base station is maximized.

5. The method of claim 4 wherein step (a) includes selecting the complex weights so that a power of a communication received by a second one of the remote users from the base station is minimized.

6. A null beam technique wherein only one of at least two remote users, all of whom employ different spreading code within a given cell or sector, is enabled to receive a communication from a base station transmitting to the at least two remote users, said base station transmitting to said remote users over an antenna array having a plurality of antennas, comprising:

a) said base station modulating data $d_i$, for $i=1, \ldots, N$, intended for one of N (N>1) remote users with N+1 complex weights $w_i$ (for $i=1, \ldots, N$, each is a N+1 complex vector), each modulated signal being directed to one of said N+1 antennas;

whereas each of the element of the vectors $w_1$ and $w_2$ is a function of the channel impulse responses from the antenna array to the location of all remote users;

b) summing the modulated data signals $d_1, d_2, \ldots d_N$ and c) transmitting the summed signals.

7. The method of claim 6 wherein the complex weights $w_i$ are made a function of the number of antennas in the array.

8. The method of claim 6 wherein step (c) comprises transmitting over an array of at least three (3) antennas.

9. The method of claim 6 wherein step (a) includes selecting the complex signals so that a power of a communication received by a first remote user from the base station is maximized.

10. The method of claim 9 wherein step (a) includes selecting the complex signals so that a power of a communication received by a second remote user from the base station is minimized.

11. A base station employing a null beam technique wherein only one of at least two remote users, all of whom employ a same or a correlated spreading code within a given cell or sector, is enabled to receive a communication from a base station transmitting to the at least two remote users, said base station transmitting to said remote users over an antenna array having a plurality of antennas, comprising:

said base station having means for modulating data $d_i$, for $i=1, \ldots, N$, intended for one of N (N>1) remote users with N+1 complex weights $w_i$ (for $i=1, \ldots, N$, each is a N+1 complex vector), each modulated signal being directed to one of said N+1 antennas;

wherein each element of the vectors $w_1$ and $w_2$ is a function of the channel impulse responses from the antenna array to locations of the remote users;

means for summing the modulated data signals $d_1, d_2, \ldots d_N$; and means for transferring the summed signals to the antenna array for transmission.

12. The base station of claim 11 further comprising means for generating complex weights $w_i$ as a function of the number of antennas in the array.

13. The base station of claim 11 wherein the array is comprised of at least two (2) antennas.

14. The base station of claim 11 further comprising means for selecting the complex weights so that a power of a communication received by a first one of the remote users from the base station is maximized.

15. The base station of claim 14 further comprising means for selecting the complex weights so that a power of a communication received by a second one of the remote users from the base station is minimized.

* * * * *

UNITED STATES PATENT AND TRADEMARK OFFICE
CERTIFICATE OF CORRECTION

PATENT NO.         : 7,218,684 B2                                    Page 1 of 1
APPLICATION NO. : 10/284741
DATED              : May 15, 2007
INVENTOR(S)        : Bolourchi et al.

It is certified that error appears in the above-identified patent and that said Letters Patent is hereby corrected as shown below:

Title Page, item (56), OTHER PUBLICATIONS, page 1, right column, line 6 before "2001", delete "Kaiserslautem" and insert therefore --Kaiserslautern--.

At column 4, line 4, after the words, "A being", delete "(xA, yA)=(70,20)" and insert therefor --$(x_A, y_A)=(70,20)$--.

At column 4, line 5, after the words "B being", delete "(xB, yB)=(50,50)" and insert therefor --$(x_B, y_B)=(50,50)$--.

At claim 7, column 4, line 60, after the word "weights" delete "w1" and insert therefor --$w_i$--.

At claim 11, column 5, line 15, before "N+1", delete "a", and insert therefor --an--.

Signed and Sealed this

Eleventh Day of December, 2007

JON W. DUDAS
*Director of the United States Patent and Trademark Office*

UNITED STATES PATENT AND TRADEMARK OFFICE
CERTIFICATE OF CORRECTION

PATENT NO. : 7,218,684 B2
APPLICATION NO. : 10/284741
DATED : May 15, 2007
INVENTOR(S) : Bolourchi et al.

It is certified that error appears in the above-identified patent and that said Letters Patent is hereby corrected as shown below:

Title Page, item (56), OTHER PUBLICATIONS, page 1, right column, line 6 before "2001", delete "Kaiserslautem" and insert therefor --Kaiserslautern--.

IN THE SPECIFICATION

At column 4, line 4, after the words "A being", delete "(xA, $y_A$)=(–70,20)" and insert therefor --($x_A$, $y_A$)=(–70,20)--.

At column 4, line 5, after the words "B being", delete "(xB, $y_B$)–(50,50)" and insert therefor --($x_B$, $y_B$)=(50,50)--.

IN THE CLAIMS

At claim 7, column 4, line 60, after the word "weights" delete "$w_1$" and insert therefor --$w_i$--.

This certificate supersedes the Certificate of Correction issued December 11, 2007.

Signed and Sealed this
Twenty-eighth Day of February, 2012

David J. Kappos
*Director of the United States Patent and Trademark Office*